UNITED STATES PATENT OFFICE.

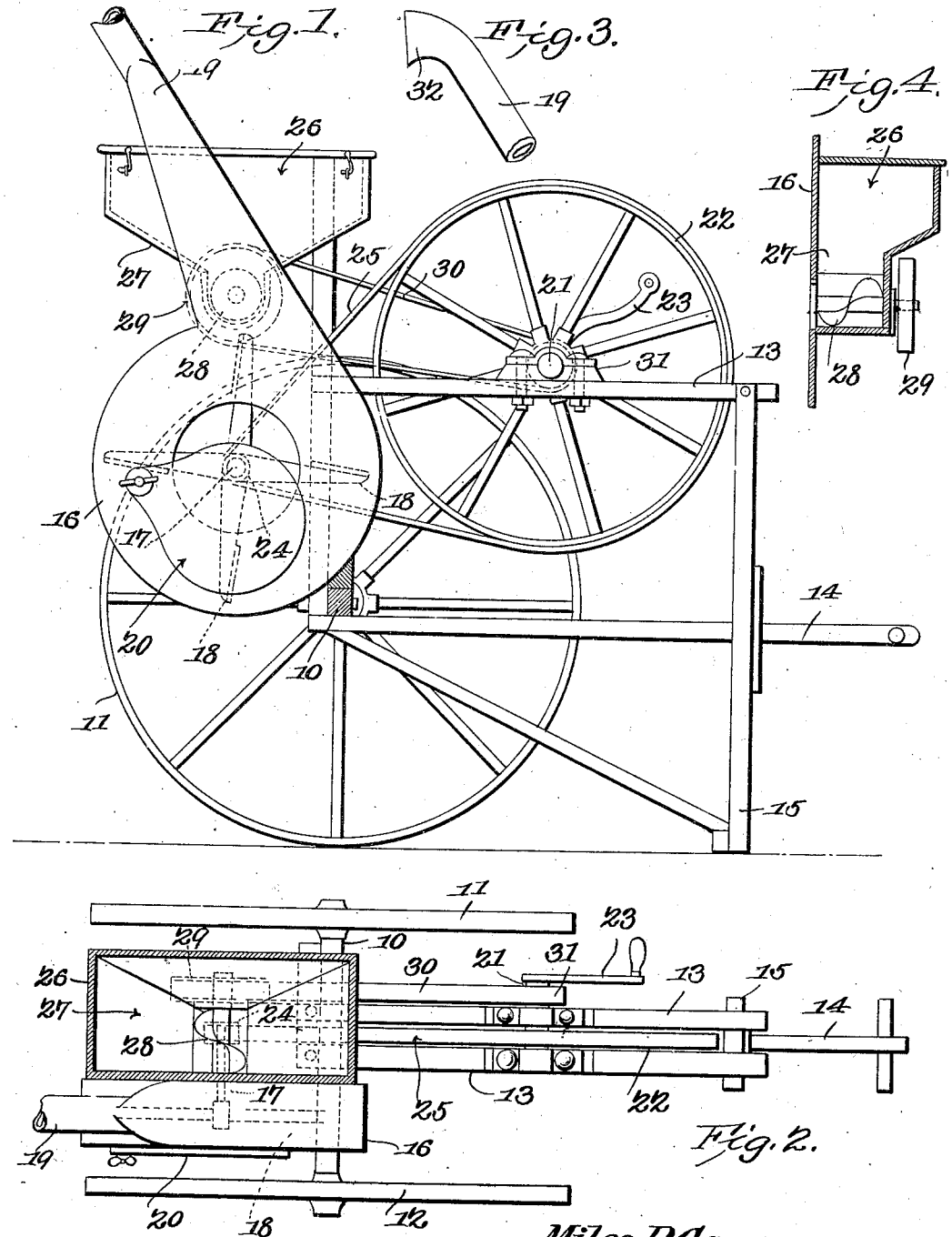

MILES P. CANNON, OF NEWCASTLE, INDIANA.

POWDER-DISTRIBUTER.

No. 828,383.
Specification of Letters Patent.
Patented Aug. 14, 1906.

Application filed January 3, 1906. Serial No. 294,489.

*To all whom it may concern:*

Be it known that I, MILES P. CANNON, a citizen of the United States, residing at Newcastle, in the county of Henry and State of Indiana, have invented a new and useful Powder-Distributer, of which the following is a specification.

This invention relates to devices for spraying or otherwise distributing insect-destroying powder upon trees, bushes, and other growing vegetation, and has for its object to improve and simplify the construction and increase the efficiency of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportions, and minor details of construction may be resorted to without departing from the principle or sacrificing any of the advantages of this invention within the scope of the appended claims.

In the drawings, Figure 1 is a side elevation. Fig. 2 is a plan view, partly in section. Fig. 3 is a view of the discharge end of the conductor-pipe. Fig. 4 is a sectional detail of the powder-receptacle and feed mechanism.

The improved device comprises an axle 10, having carrying-wheels 11 12, and a rearwardly-extending frame 13, provided with a handle 14 and supporting-leg 15, of any approved construction. Supported by the axle 10 and frame 13 is a fan-case 16, having a fan-shaft 17 and fan-blades (indicated at 18) of the usual form, and with an outlet-pipe 19 extending to any required distance therefrom and terminating in any required form of nozzle, as indicated at 32 in Fig. 3, the sides of the discharge 19 converging for a distance, as shown. The fan-case is also provided with a movable closure 20 to control the inflow of the air to the fan. Mounted for rotation upon the frame 13 is a shaft 21, having a belt-wheel 22 and operating-crank 23. A belt-pulley 24 is mounted upon the fan-shaft and adapted to be driven by a belt 25 from the driven pulley 22, by which motion is imparted to the fan.

Supported by the frame 13 and fan-case 16 is a receptacle 26 for the powder to be distributed and formed with a hopper-bottom 27, terminating in a screw feed device 28, leading into the converging outlet of the fan-case at one side. The screw feed device is provided with a drive-pulley 29, over which a drive-belt 30 leads from a smaller pulley 31 on the shaft 21. By this means the screw feed device is slowly rotated as the fan is operated to supply the powder in suitable quantities to the converging discharge from the fan, and is carried thence into the contracted portion of the conductor-tube, and the force of the movements materially accelerated by the form of the discharge herein shown. The force of the current strikes the material as it flows from the discharge and carries it into the gradually-converging conductor, the current increasing in strength as it moves upward, and the material being correspondingly influenced is discharged with greater force and consequently thrown to a greater distance from the nozzle.

It will be noted that the fan-case 16, conductor-pipe 19, and the receptacle 26 and its feed device are disposed in advance of the axle 10, while the frame 13, handle 14, support 15, shaft 21, with its attached pulleys and crank, are disposed at the rear of the axle, thus slightly overbalancing the parts forward of the axle and materially reducing the labor and time required in handling the device and directing its action.

The apparatus being mounted upon two wheels only, the discharge end 32 of the pipe 19 may be readily directed laterally or vertically to any required extent to direct the powder to any point required. The powder may thus be applied to all forms of vegetation from trees to the smaller vines upon the ground with equal facility.

Having thus described the invention, what is claimed is—

1. A powder-distributer comprising a wheel-supported frame, a rotary fan mounted upon the frame, a hopper superimposed upon the frame, a worm-shaft journaled in said hopper and being located vertically above the shaft of said fan, said hopper having an outlet located about the shaft of the worm, a power-shaft, and means for transmitting rotary motion from said power-shaft to said rotary fan and to the worm.

2. A powder-distributer comprising a wheel-mounted frame, a rotary fan mounted upon the frame, a hopper superimposed upon the frame, a worm journaled in said hopper, said hopper having an outlet leading into the fan-casing vertically above the fan-shaft, a power-shaft journaled upon the frame, and means for transmitting rotary motion from the power-shaft to the fan and to the worm.

In testimony that I claim the foregoing as my own I have hereto affixed my signature in the presence of two witnesses.

MILES P. CANNON.

Witnesses:
LULU CRAIG.
ELLA HASSETT.